(12) United States Patent
Chatterjee et al.

(10) Patent No.: US 8,619,952 B2
(45) Date of Patent: Dec. 31, 2013

(54) DISPLAYING PHONE NUMBER ON THE LANDING PAGE BASED ON KEYWORDS

(75) Inventors: Surojit Chatterjee, Fremont, CA (US); Anshul Kothari, Sunnyvale, CA (US); Chen Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 294 days.

(21) Appl. No.: 12/985,745

(22) Filed: Jan. 6, 2011

(65) Prior Publication Data
US 2012/0177189 A1 Jul. 12, 2012

(51) Int. Cl.
*H04M 11/00* (2006.01)
(52) U.S. Cl.
USPC ............. 379/93.17; 379/90.01; 705/14.55
(58) Field of Classification Search
USPC ............. 379/93.17, 93.12, 90.01; 705/14.4, 705/14.41, 14.45, 14.55
See application file for complete search history.

(56) References Cited

U.S. PATENT DOCUMENTS

2005/0203909 A1* 9/2005 Zhao ............................ 707/10
2008/0162286 A1* 7/2008 Lieberman et al. ........... 705/14

* cited by examiner

*Primary Examiner* — Stella Woo
(74) *Attorney, Agent, or Firm* — Hall Estill Law Firm

(57) ABSTRACT

Various methods, systems, and computer program products are disclosed for determining promotional messages that led to a phone call. The method may include communicating a promotional message, wherein the promotional message is associated with a phone number. The method may include receiving an indication that the promotional message was selected. The method may include receiving a phone call via the phone number, the phone call indicating the phone number that was called. The method may include associating the phone call with the promotional message based on the phone number. The method may include determining that the communicated promotional message led to the phone call based on the associated phone call and promotional message.

25 Claims, 8 Drawing Sheets

DISPLAYING PHONE NUMBER ON THE LANDING PAGE BASED ON KEYWORDS

FIELD OF THE INVENTION

The disclosure relates to communicating response(s) to computing device(s) and in particular to determining promotional messages that led to phone call(s).

BACKGROUND OF THE INVENTION

Conventional systems fail to leverage phone calls to identify effective keywords for entities such as advertisers that promote goods and/or services. Conventional systems fail to provide the advertisers knowledge about which particular keywords are highest performing for their campaign in terms of giving them conversions through phone calls. Furthermore, when tracking conversions for advertising campaigns, conventional systems fail to include phone call conversions. What is needed is a system and method that determines effective keywords for advertisers based, at least in part, on phone calls received from callers and that determines promotional messages that led to phone call(s). These and other problems exist.

SUMMARY OF THE INVENTION

Various systems, computer program products, and methods for determining promotional messages that led to phone call(s) and changing phone number(s) on content communicated to a user, are described herein.

According to various implementations of the invention, the method may include determining promotional messages that led to a phone call. The method may include communicating a promotional message, wherein the promotional message is associated with a phone number. The method may include receiving an indication that the promotional message was selected. The method may include receiving a phone call via the phone number, the phone call indicating the phone number that was called. The method may include associating the phone call with the promotional message based on the phone number. The method may include determining that the communicated promotional message led to the phone call based on the associated phone call and promotional message.

According to various implementations of the invention, the method may include changing phone numbers on content communicated to a user. The method may include receiving a request to provide a phone number to be included in electronic content of an entity, wherein the phone number is selected from at least a first phone number associated with a promotional message or a default phone number associated with the entity. The method may include determining whether the promotional message was selected by the user prior to an access of the electronic content. The method may include providing the first phone number when the promotional message was selected by the user. The method may include providing the default phone number when the promotional message was not selected by the user.

DETAILED DESCRIPTION OF THE INVENTION

Figure 1:
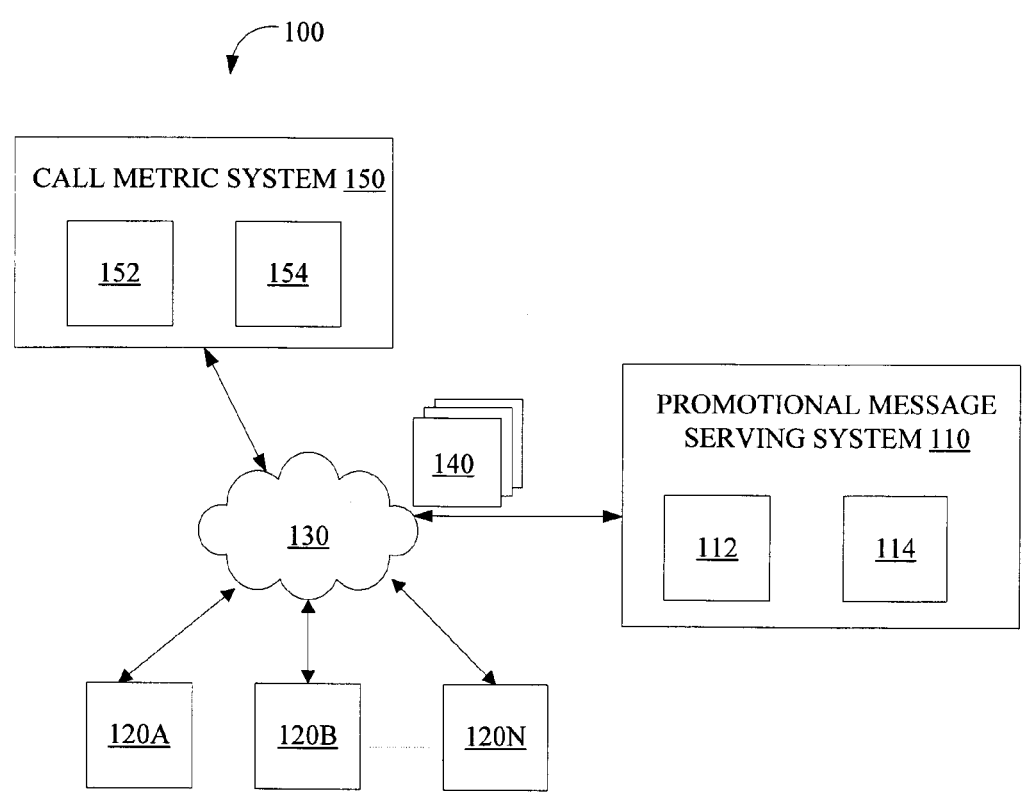
FIG. 1 is a block diagram illustrating a system of determining effective keywords and tracking calls originated by phone number(s), according to various implementations of the invention.

FIG. 1 is a block diagram illustrating a system 100 of determining effective keywords and tracking calls originated by phone number(s), according to various implementations of the invention. In some implementations, an effective keyword may include a keyword that is likely to be searched by a user. In some implementations, an effective keyword may include a keyword that when matched to a promotional message is likely to lead to a clicked or otherwise selected promotional message. In other words, a keyword may be defined as an effective keyword if a user is likely to select a promotional message that is displayed in response to the keyword. In some implementations, an effective keyword may include a keyword that is likely to generate a call to an entity, such as an advertiser.

According to various implementations of the invention, system 100 may include, but is not limited to, a promotional message serving system 110, a call metric system 150 and a computing device 120 (illustrated in FIG. 1 as a plurality of computing devices 120A, 120B, 120N). In some implementations of the invention, promotional message serving system 110, call metric system 150 and computing device 120 may be coupled to one another via a network 130. Network 130 may include a Local Area Network, a Wide Area Network, a cellular communications network, a Public Switched Telephone Network, and/or other network or combination of networks.

According to various implementations of the invention, promotional message serving system 110 may include processor 112, memory 114, and/or other components that facilitate the functions of the promotional message serving system 110 described herein. In some implementations, processor 112 includes one or more processors configured to perform various functions of promotional message serving system 110. In some implementations, memory 114 includes one or more tangible (i.e., non-transitory) computer readable media. Memory 114 may include one or more instructions that when executed by processor 112 configure processor 112 to perform the functions of promotional message serving system 110. In some implementations, memory 114 may include one or more instructions stored on tangible computer readable media that when executed at a remote device, such as computing device 120, cause the remote device to display promotional messages, web pages, or other content associated with the entity, as described herein.

According to various implementations of the invention, call metric system 150 may include processor 152, memory 154, and/or other components that facilitate the functions of the call metric system 150 described herein. In some implementations, processor 152 includes one or more processors configured to perform various functions of call metric system 150. In some implementations, memory 154 includes one or more tangible (i.e., non-transitory) computer readable media. Memory 154 may include one or more instructions that when executed by processor 152 configure processor 152 to perform the functions of call metric system 150. In some implementations, memory 154 may include one or more instructions stored on tangible computer readable media that when executed at a remote device, such as computing device 120, cause the remote device to display at least one report, as described herein.

In some implementations, while promotional message serving system 110 and call metric system 150 have been depicted as separate systems in FIG. 1, it will be appreciated that these systems may be included in one or more systems configured to individually or together perform the functions associated with promotional message serving system 110 and call metric system 150 described herein.

According to various implementations of the invention, computing device 120 may include a computing device such as a desktop computer, a laptop computer, a cellular telephone, a personal digital assistant, a tablet computing device, and/or other computing device on which promotional messages, web pages, and/or other content associated with the entity may be displayed.

In some implementations of the invention, call metric system 150 may associate at least one tracked keyword with at least one phone number. The tracked keywords may include one or more letters, numbers, characters, symbols, words, and/or any combination of the foregoing. In some implementations, a tracked keyword may be associated with an entity, such as an advertiser. In some implementations the tracked keyword may be a keyword that the entity wishes to target such that a promotional message associated with the entity may be displayed in response to a tracked keyword. For example, an advertiser or other entity may select "shoes" as a tracked keyword, such that whenever a user searches for shoes (for example, using a search engine), an advertisement for shoes associated with the advertiser is displayed to the user.

In some implementations of the invention, each tracked keyword of one or more tracked keywords may be associated with at least one unique phone number of one or more phone numbers. In some implementations, call metric system 150 may include a list of one or more tracked keywords and the phone number(s) associated with each tracked keyword. In some implementations, the list may be stored in memory 154, for example. In some implementations, the tracked keywords from the list may be received from an advertiser. In some implementations, the one or more phone numbers may be associated with the same advertiser with which the tracked keywords are associated. In some implementations, the one or more phone numbers may be mapped to the advertiser's phone numbers. In these implementations, for example, the one or more phone numbers may include a phone number that connects to a call center, such as call metric system 150, and that is mapped to the advertiser's phone number. In some implementations, the one or more phone numbers may be associated with a different entity (for example, a phone directory service) that has knowledge of the advertiser's phone numbers and may map the one or more phone numbers to the advertiser's phone numbers.

In some implementations, one or more calls originated by the at least one phone number may be tracked and at least one keyword that led to the call may be determined based on the association between the at least one tracked keyword and the at least one phone number. In some implementations, call metric system 150 may track the received one or more calls. In some implementations, tracking may include monitoring the duration of the calls, determining an area code of the caller associated with the calls, recording a date/time of the calls, recording the calls, transcribing the calls (for the advertiser, for example), and/or performing other functions that facilitate an analysis of the calls.

In some implementations of the invention, promotional message serving system 110 may receive a request associated with a computing device 120. In some implementations of the invention, the request includes a request for promotional messages, web pages and/or other electronic content to be communicated to computing device 120. In some implementations, the request may be related to an application or other process executing at computing device 120. In some implementations, the request includes one or more search terms (i.e., keywords) from an operator/user of computing device 120 entered into a search engine. The search engine may be a web-based search engine and/or a search engine that searches a hard drive or other component of computing device 120. In some implementations, the request may be related to an application such as a gaming or other application being displayed at computing device 120. For example, the request may include a login to an online gaming application accessed using computing device 120. In some implementations, the request may include location information that indicates a geographic location of computing device 120 (for example, in case the computing device is a portable computing device). Other types of requests related to applications and/or processes executing at computing device 120 may be received by promotional message serving system 110 as would be appreciated.

In some implementations of the invention, the request may include one or more request keywords entered by a user of computing device 120. The request keywords may include one or more letters, numbers, characters, symbols, words, and/or any combination of the foregoing. In some implementations, based on the request (i.e., the request keywords), promotional message serving system may generate one or more responses 140 to be communicated to and displayed at computing device 120. In some implementations, a response may include a promotional message associated with an entity, a web page associated with an entity, a landing page associated with an entity, and/or other responses. In some implementations, generating a response 140 may include identifying a promotional message associated with an entity to be communicated to computing device 120 based on the one or more request keywords. In some implementations, the entity may include an advertiser, retailer and/or any other entity that is associated with the response. For example, promotional message serving system 110 may generate one or more responses related to: request keywords entered by the operator of computing device 120 (such as florist advertisements when the user searches for "online flowers"); a gaming application being played by the operator of computing device 120 (such as a response related to other gaming applications or upgrades to the gaming application being played); the location of computing device 120 (such as advertisements from retailers within walking distance of computing device 120, i.e., in case the computing device is a portable computing device); and/or other responses related to the request from computing device 120.

In some implementations, the promotional messages may include, but is not limited to, one or more advertisements, one or more coupons, and/or other promotional/marketing content. In some implementations, promotional messages may include various types of formats such as text, image, video, audio, other formats suitable to convey promotional messages, and/or any combination of formats.

In some implementations of the invention, promotional message serving system 110 may determine a match between at least one tracked keyword and the one or more request keywords included in the request. In some implementations, promotional message serving system 110 may compare the one or more request keywords with the tracked keywords to determine a match between the request keywords and the tracked keywords. In some implementations, the comparison may include a character comparison, a word comparison, fuzzy comparison, and/or other comparison techniques. As used herein "match" need not be an exact match between the request keywords and the tracked keywords as would be appreciated. In response to a determination that there is a match between at least one tracked keyword and the one or more request keywords, promotional message serving system 110 may select at least one phone number associated with the tracked keyword. In some implementations, promotional message serving system 110 may communicate with call metric system 150 to determine a match between at least one tracked keyword and the one or more request keywords compare the request keywords with the tracked keywords, and/or to select the phone number associated with the tracked keyword.

In some implementations of the invention, promotional message serving system 110 may generate a response 140 to the request, wherein the response may comprise the selected at least one phone number such that a call to the at least one phone number is associated with the at least one tracked keyword that led to the call. In some implementations, promotional message serving system 110 may communicate the response to be displayed at computing device 120. In some implementations of the invention, promotional message serving system 110 may communicate the response to a third party that subsequently communicates the response to computing device 120. In some implementations of the invention, promotional message serving system 110 may communicate the response directly to computing device 120.

In some implementations, the response may include a promotional message associated with an entity, a web page associated with an entity, a landing page associated with an entity, and/or other responses. In some implementations, the selected phone number may be included in any type of response. For example, a promotional message (for example, an advertisement) may be displayed to user of computing device 120. The user may click on or otherwise select the advertisement which may cause a website associated with the entity to be displayed. The website may have any number of web pages and landing pages associated with it. As such, the selected phone number may be included in the promotional message or any of the web pages and landing pages associated with the website.

In some implementations, the entity may incorporate one or more instructions such as java script code in the website such that when a user selection causes the website to be displayed, the selected phone number may be displayed on the website. In other words, when the website is visited, the code is executed and causes the selected phone number to be inserted in the web page/landing page. As such, when the web page/landing page is displayed at computing device 120, the selected phone number is also displayed. It will be understood that any other scripting language may be used as long as the code causes the phone number to be inserted/displayed.

In some implementations, upon receiving the response, a user may call the phone number included in the response. In some implementations, call metric system 150 may receive and track the call. In some implementations, call metric system 150 may determine the phone number that originated the call. In some implementations, call metric system 150 may identify at least one tracked keyword that led to the call based on the phone number associated with the call. In some implementations, call metric system 150 may identify the at least one tracked keyword based on the association of the tracked keyword with the phone number, as described above.

In some implementations, call metric system 150 may establish a call between the user and the entity associated with the at least one tracked keyword (which may the entity associated with the promotional message/website) based on the received call. In some implementations, establishing a call may include forwarding the call to the entity, dialing the entity and bridging the call, etc.

Figure 2:
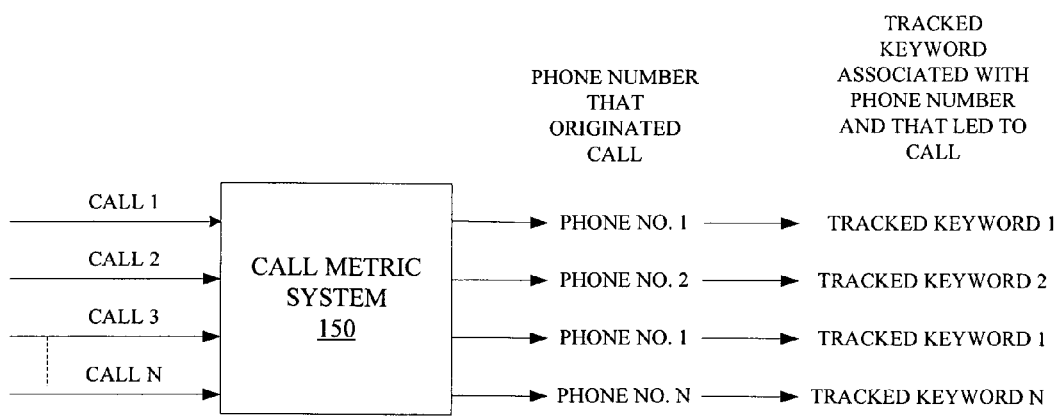
FIG. 2 is a diagram illustrating example functions performed by a call metric system, according to various implementations of the invention.

FIG. 2 is a diagram illustrating example functions performed by call metric system 150, according to various implementations of the invention. In some implementations, call metric system 150 may receive, from a caller, one or more calls (illustrated in FIG. 2 as CALL 1, CALL 2, CALL 3, . . . , CALL N). Call metric system 150 may determine, for each call of the one or more calls, at least one phone number that originated the one or more calls. For example, call metric system 150 may determine that phone number 1 originated call 1, phone number 2 originated call 2, phone number 1 originated call 3, phone number N originated call N, and so forth.

In some implementations, call metric system 150 may identify at least one tracked keyword of one or more tracked keywords based on the at least one phone number. In some implementations, call metric system 150 may identify at least one tracked keyword based on the association of the at least one tracked keyword with the at least one phone number. For example, tracked keyword 1 may be identified as the tracked keyword associated with phone number 1. In other words, tracked keyword 1 led to call 1. Tracked keyword 2 may be identified as the tracked keyword associated with phone number 2. In other words, tracked keyword 2 led to call 2. Similarly, tracked keyword N may be identified as the tracked keyword associated with phone number N. In other words, tracked keyword N led to call N.

In some implementations, call metric system 150 may establish a call between the caller and an entity associated with the at least one tracked keyword based on the received one or more calls.

In some implementations, call metric system 150 may determine that tracked keyword 1 has led to more calls for an entity than tracked keyword 2 or tracked keyword N. For example, as can be seen in FIG. 2, tracked keyword 1 lead to both call 1 and call 3, whereas tracked keyword 2 and N led to calls 2 and N, respectively.

In some implementations, call metric system 150 may rank each tracked keyword based on the received one or more calls. For example, call metric system 150 may rank tracked keyword 1 higher than tracked keyword 2 or tracked keyword N because tracked keyword 1 led to a higher number of calls for the entity. In other words, tracked keyword 1 may be a more effective keyword that tracked keywords 2 and N because tracked keyword 1 led to more calls. For example, for a clothing retailer, tracked keywords related to women's garments may lead to a higher number of calls than tracked keywords related to accessories. Similarly, for a communications products website, tracked keywords related to internet products may lead to higher number of calls than tracked keywords related to land-line phone products.

In some implementations, call metric system 150 may determine, for each tracked keyword of the one or more tracked keywords, a number of calls received from the phone number associated with the tracked keyword. For example, a determination may be made that two calls were received from phone number 1 associated with tracked keyword 1, one call was received from phone number 2 associated with tracked keyword 2, one call was received from phone number N associated with tracked keyword N, and so forth.

In some implementations, call metric system 150 may generate a report. In some implementations, the report may include the one or more tracked keywords and the phone numbers associated with the tracked keywords. In some implementations, the report may include the determined number of calls for each tracked keyword. In other words, the report may include, for each tracked keyword, a number of calls received from the phone number associated with the tracked keyword. In some implementations, the report may include the monitored, recorded, and/or transcribed information associated with the calls. In some implementations, the report may include conventional metrics associated with keywords as would be appreciated.

In some implementations, call metric system 150 may receive a request for the report from an advertiser or other entity. The advertiser or other entity may indicate, among other things, one or more tracked keywords for which they would like the report to be generated. In response to the request, call metric system 150 may generate the report for the tracked keywords and communicate the report to a remote computing device used by an advertiser (not otherwise illustrated in FIG. 1).

In some implementations, call metric system 150 may determine whether a tracked keyword is an effective keyword for the entity based on, for example, the number of calls received from the phone number associated with the tracked keyword. If a tracked keyword has led to a large number (such as a predefined number according to particular needs) of calls, a determination may be made that the tracked keyword is an effective keyword.

In some implementations, each tracked keyword may be associated with a bid. The bid may include a value or other indication that indicates a dollar or other currency amount that an entity, such as an advertiser, is willing to pay to have a promotional message associated with the tracked keyword to be displayed in the advertising network to which the promotional message serving system 110 has access. In some implementations, based on the determination that the tracked keyword is an effective keyword for the entity, a higher bid may be associated with the tracked keyword than another keyword that is determined to be a less effective keyword.

In some implementations, call metric system 150 may determine a tracked keyword led to a call based on one or more events. For example, the events may include, but is not limited to, a user generating a request that includes request keyword(s), a promotional message associated with an entity being displayed in response to the request keyword(s), the user selecting the promotional message, a website associated with the entity being visited, the user calling the phone number included in the landing page/web page, wherein the phone number is associated with at least one tracked keyword and is selected based on a match between at least one tracked keyword and the request keywords. In some implementations, when the user selects the promotional message and visits a web page associated with a website, a browser cookie may be stored by the web browser used by the user of computing device 120. In some implementations, a URL (uniform resource locator) of the web page and the date/time of the visit may also be stored.

In some implementations, for call 1 in FIG. 2, for example, call metric system 150 may determine one or more events that led to a call 1. Call metric system 150 may determine that phone number 1 originated call 1. Call metric system 150 may identify tracked keyword 1 as the tracked keyword associated with phone number 1 (i.e., that tracked keyword 1 led to call 1). Call metric system 150 may determine a length of time in which phone number 1 was associated with tracked keyword 1. In other words, call metric system 150 may determine a time window for the association. Call metric system 150 may determine: an estimated time when a request keyword matching tracked keyword 1 was entered at computing device 120, an estimated time when a website associated with the entity (associated with tracked keyword 1) was visited and an estimated time when a promotional message that caused the website visit was selected by the user. Thus, call metric system 150 may determine that call 1 was received due to the selection of the promotional message. In other words, based on timing of various events, call metric system 150 may determine which of the one or more keywords and/or promotional message selections led to a particular call.

As used herein, "selecting" or "selection of" a promotional message includes, but is not limited to, clicking with a finger, a stylus, or other object; shaking or tapping computing device 120 (in the case where the computing device is portable, for example); uttering a verbal command; and/or taking any other action in relation to computing device 120 to indicate a selection of a promotional message.

Figure 3:
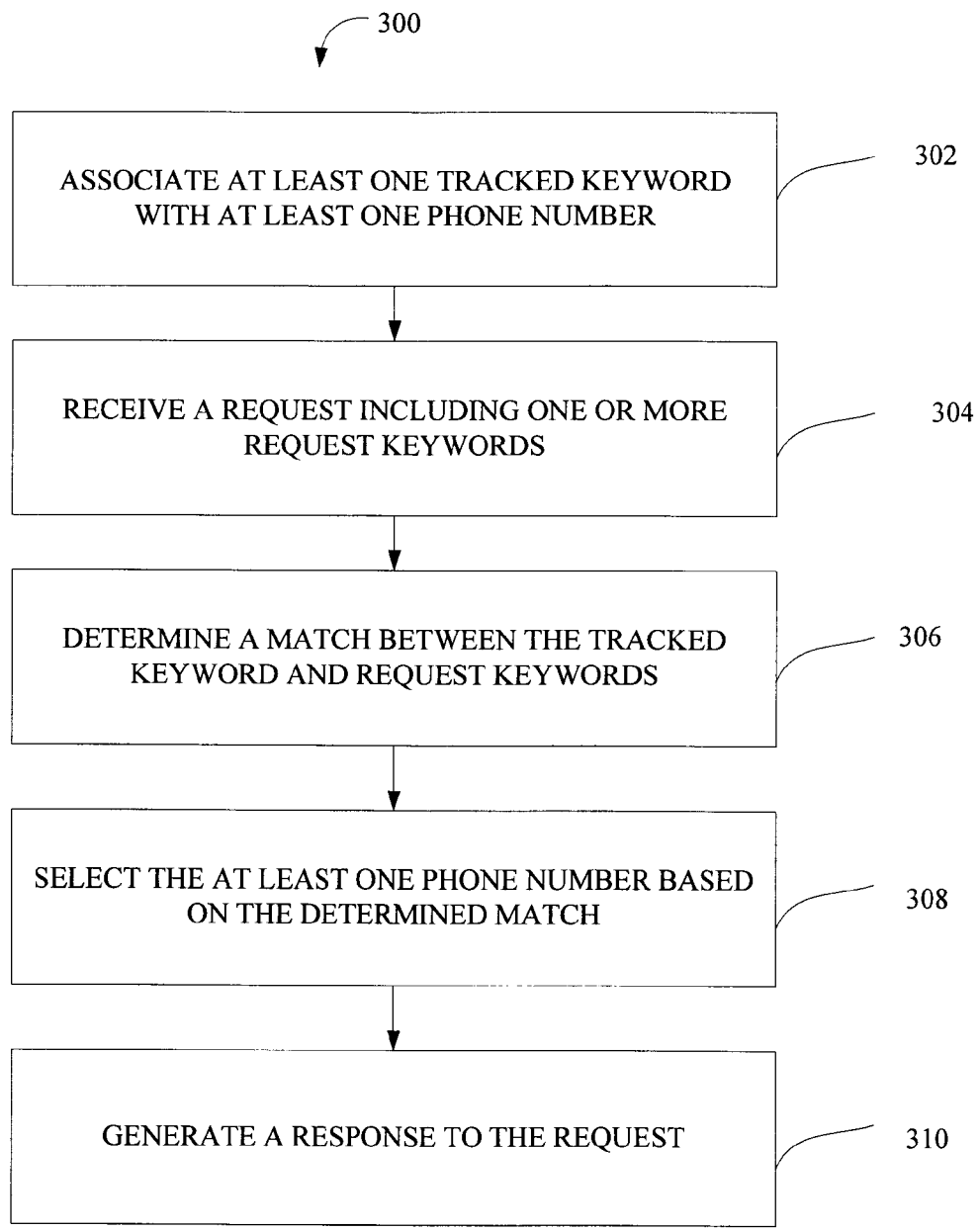
FIG. 3 is a flow diagram illustrating an example process of determining effective keywords, according to various implementations of the invention.

FIG. 3 is a flow diagram illustrating an example process 300 of determining effective keywords, according to various implementations of the invention. The various processing operations and/or data flows depicted in FIG. 3 (and in the other drawing figures) are described in greater detail herein. The described operations for a flow diagram may be accomplished using some or all of the system components described in detail above and, in some implementations of the invention, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

In some implementations of the invention, process 300 may associate at least one tracked keyword with at least one phone number in an operation 302. In some implementations, each tracked keyword from among one or more tracked keywords may be associated with at least one unique phone number from among one or more phone numbers. In some implementations, the one or more phone numbers may be associated with the same entity (for example, an advertiser) with which the tracked keywords are associated. In some implementations, the one or more phone numbers may be mapped to the advertiser's phone numbers. In some implementations, the one or more phone numbers may be associated with a different entity that has knowledge of the advertiser's phone numbers and may map the one or more phone numbers to the advertiser's phone numbers.

In some implementations, the at least one tracked keyword may be associated with the at least one phone number statically. In other words, the association between the tracked keyword and the phone number is pre-defined for at least a predetermined period of time so that the at least one tracked keyword remains associated with the phone number for the predefined period of time. In these implementations, keywords that are believed to be effect keywords may be tracked over time in order to assess their call rates over the predetermined period of time. In some implementations, the association may be predefined by the advertiser associated with the tracked keyword. In these implementations, the process may receive the pre-defined association from the advertiser.

In some implementations, the at least one tracked keyword may be associated with the at least one phone number dynamically. In other words, the association may be transient so that the association is made, for example, in response to a request including request keywords. In some implementations, a pool of available phone numbers (i.e., phone numbers that are not already in use) may be provided dynamically. In these implementations, different tracked keywords may be associated with at least one available phone number from the pool of available phone numbers in an alternating manner. For example, a phone number may be selected from among the available phone numbers in a round-robin, random, or otherwise alternating manner. The selected phone number may be associated with a tracked keyword, thereby dynamically associating the at least one tracked keyword with the at least one phone number.

In an operation 304, process 300 may receive a request including one or more request keywords entered by a user of computing device 120. In operation 306, process 300 may determine a match between at least one tracked keyword and the one or more request keywords included in the request. In some implementations, process 300 may compare the one or more request keywords with the tracked keywords to determine a match.

In an operation 308, process 300 may select at least one phone number associated with the tracked keyword based on the determined match. In an operation 310, process 300 may generate a response to the request, wherein the response may comprise the selected at least one phone number such that a call to the at least one phone number is associated with the at least one tracked keyword that led to the call. In some implementations, the response may include a promotional message associated with an entity, a web page associated with an entity, a landing page associated with an entity, and/or other responses. In some implementations, the selected phone number may be included in any type of response.

Figure 4:
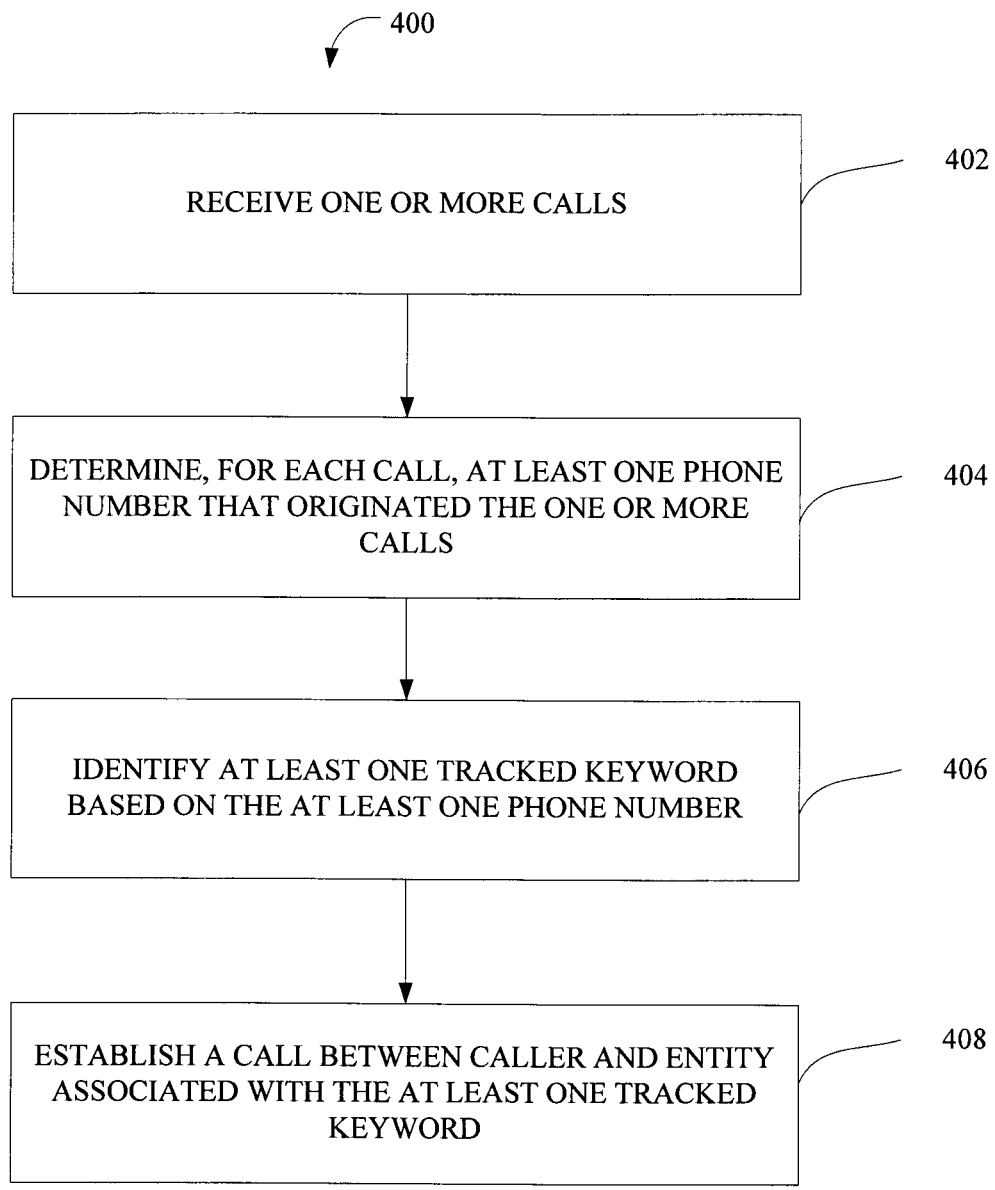
FIG. 4 is a flow diagram illustrating an example process of tracking one or more calls, according to various implementations of the invention.

FIG. 4 is a flow diagram illustrating an example process 400 of tracking one or more calls, according to various implementations of the invention. In an operation 402, process 400 may receive one or more calls from a caller. In an operation 404, process 400 may determine, for each call of the one or more calls, at least one phone number that originated the one or more calls. In an operation 406, process 400 may identify at least one tracked keyword that led to each call based on the at least one phone number associated with the call. In some implementations, process 400 may identify the at least one tracked keyword based on the association of the tracked keyword with the at least one phone number. In an operation 408, process 400 may establish a call between the caller and an entity associated with the at least one tracked keyword based on the received one or more calls. In some implementations, establishing a call may include forwarding the call to the entity, dialing the entity and bridging the call, etc.

Figure 5:
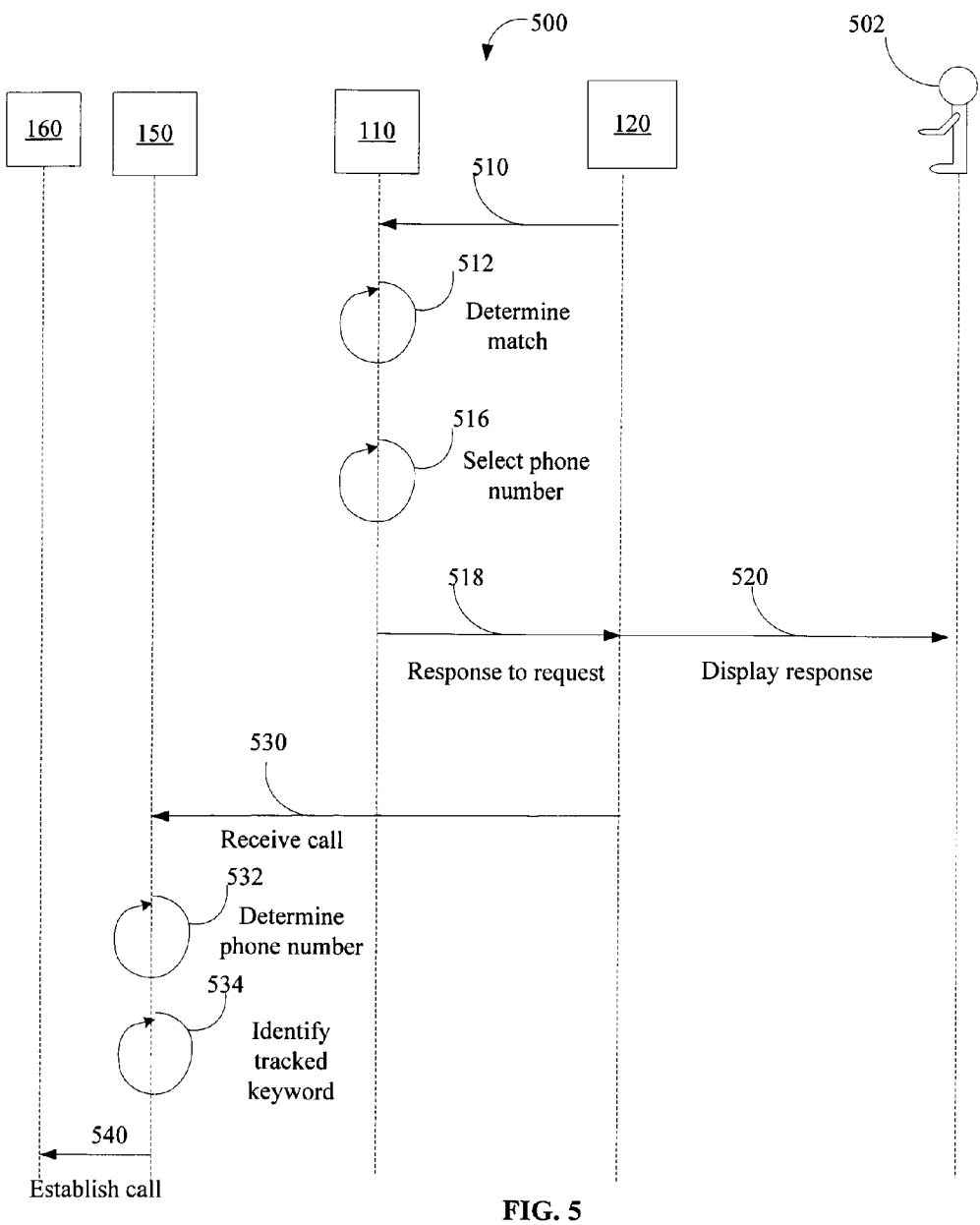
FIG. 5 is a data flow diagram illustrating process relationships in a system of determining effective keywords and tracking calls originated by the phone number(s), according to various implementations of the invention.

FIG. 5 is a data flow diagram 500 illustrating example process relationships in a system of determining effective keywords and tracking calls originated by the phone number (s), according to various implementations of the invention.

According to various implementations of the invention, in an operation 510, promotional message serving system 110 may receive a request including one or more request keywords. In an operation 512, promotional message serving system 110 may determine a match between at least one tracked keyword and the one or more request keywords included in the request. In some implementations, the at least one tracked keyword may be associated with entity 160 (such as, for example, an advertiser).

In an operation 516, promotional message serving system 110 may select at least one phone number associated with the tracked keyword based on the determined match. In an operation 518, promotional message serving system 110 may generate a response to the request, wherein the response may comprise the selected at least one phone number such that a call to the at least one phone number is associated with the at least one tracked keyword that led to the call. Promotional message serving system 110 may communicate the generated response to computing device 120. The response may be viewed by user 502 of computing device 120.

In some implementations, user 502 may call the phone number included in the response. In operation 530, call metric system 150 may receive the call from computing device 120 or other device used by user 502 to make the call. In an operation 532, call metric system 150 may determine at least one phone number that originated the call. In an operation 534, call metric system 150 may identify at least one tracked keyword based on the determined at least one phone number. In some implementations, call metric system 150 may identify the at least one tracked keyword based on the association of the tracked keyword with the at least one phone number. In some implementations, call metric system 150 may determine that the at least one tracked keyword led to the received call.

In some implementations, in operation 540, call metric system 150 may establish a call between user 502 and entity 160 based on the received call.

Figure 6:
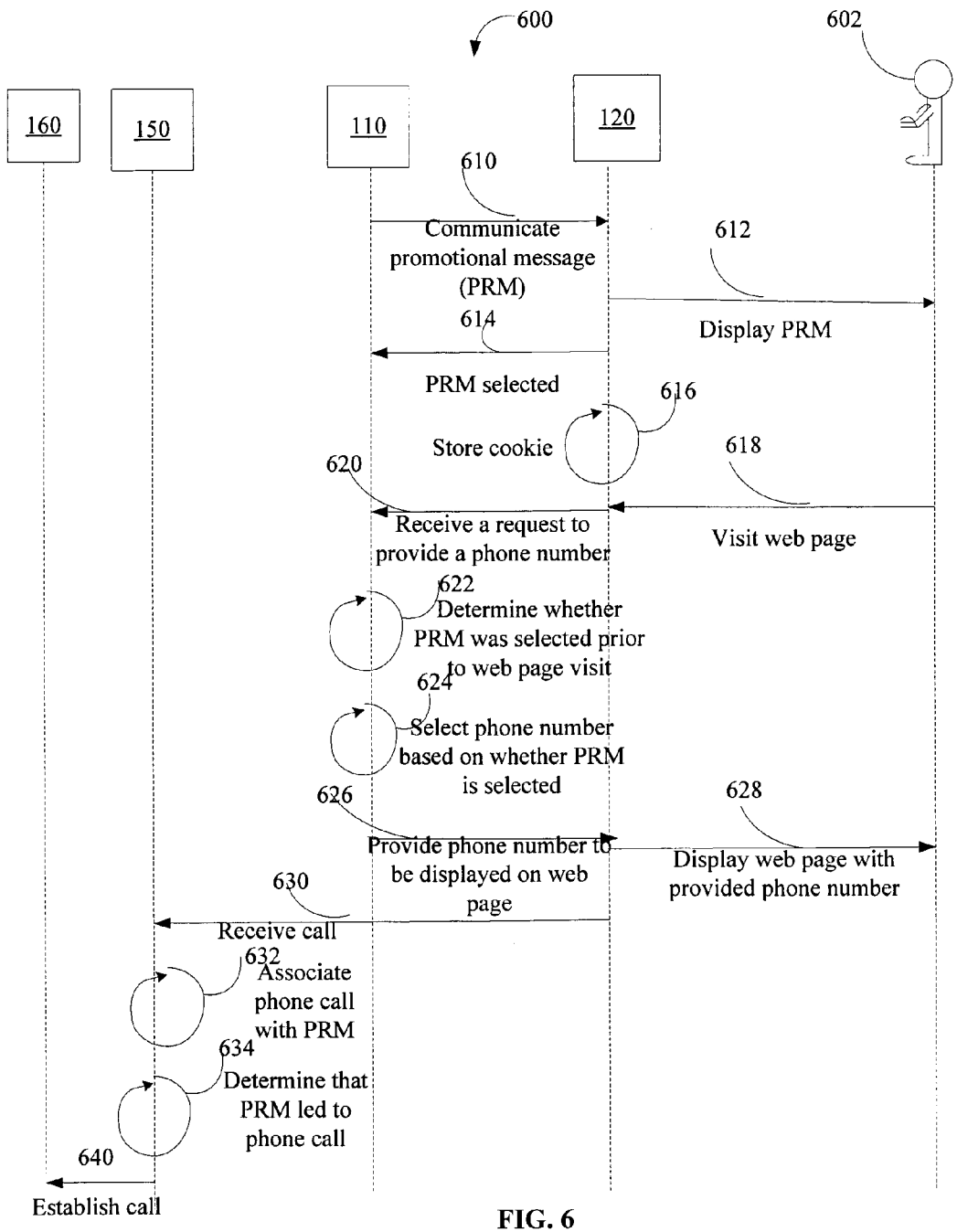
FIG. 6 is a data flow diagram illustrating process relationships in a system of determining promotional messages that led to a phone call and changing phone numbers on content communicated to a user, according to various implementations of the invention.

FIG. 6 is a data flow diagram illustrating example process relationships in a system of determining promotional messages that led to a phone call and changing phone numbers on content communicated to a user, according to various implementations of the invention.

According to various implementations of the invention, in an operation 610, promotional message serving system 110 may communicate a promotional message to computing device 120. Promotional message serving system 110 may communicate the promotional message in response to a request associated with computing device 120, wherein the request may include a request for promotional messages, web pages, and/or other electronic content to be communicated to computing device 120. In some implementations, the request may include one or more request keywords as described above. In some implementations, promotional message serving system 110 may communicate the promotional message to be displayed at computing device 120. In some implementations, in operation 612, the promotional message may be viewed by user 602 of computing device 120.

In some implementations, each promotional message of one or more promotional messages may be associated with at least one phone number of one or more phone numbers. In some implementations, the one or more phone numbers may be associated with entity 160 with which the at least one promotional message is associated. In these implementations, for example, the one or more phone numbers may include a phone number of an advertiser such as a phone number of a retail location. In some implementations, the one or more phone numbers may be mapped to the advertiser's phone numbers. In these implementations, for example, the one or more phone numbers may include a phone number that connects to a call center, such as call metric system 150, and that is mapped to the advertiser's phone number. In some implementations, the one or more phone numbers may be associated with a different entity (for example, a phone directory service) that has knowledge of the advertiser's phone numbers and may map the one or more phone numbers to the advertiser's phone numbers. In some implementations, the association(s) may be stored in a memory such as memory 154 of call metric system 150.

In some implementations, entity 160 may include an advertiser, retailer and/or any other entity associated with the promotional message. For example, an entity may include an advertiser that wishes to communicate a promotional message such as an advertisement to a user. In this example, promotional message serving system 110 may receive the advertisement to be communicated to a user on behalf of the advertiser at an appropriate time (such as, without limitation, alongside search engine results, within a webpage, or within a graphical user interface).

In some implementations, in an operation 614, promotional message serving system 110 may receive an indication that the promotional message was selected. For example, in some implementations, user 602 of computing device 120 may click on or otherwise select the promotional message.

In some implementations, in an operation 616, computing device 120 may store in a memory of computing device 120 a cookie or other indication that the promotional message was selected. In some implementations, computing device 120 may store the cookie in response to the selection of the promotional message. In some implementations, computing device 120 may generate the cookie. In some implementations, promotional message serving system 110 may generate the cookie and communicate the cookie to computing device 120 to be stored at computing device 120. In some implementations, promotional message serving system 110 may store the cookie or other indication in a memory accessible to promotional message serving system 110. In these implementations, the cookie or other indication may be used to determine that user 602 selected the promotional message whether user 602 uses same computing device 120 or another computing device. For example, when user 602 is logged into an online profile using a computing device different from computing device 120, the online profile may be used to identify user 602 and subsequently retrieve the cookie or other indication from the memory accessible to promotional message serving system 110. In some implementations, the cookie may include information identifying the promotional message selected, a date/time that the promotional message was selected, an expiration date/time for the cookie, information identifying an entity and/or website/web page associated with the entity with which the promotional message is associated, and/or other information.

In some implementations, in an operation 618, user 602 of computing device 120 may visit/access a web page or other electronic content associated with an entity (for example entity 160). In some implementations, a landing page associated with the entity may be visited/accessed. In some implementations, a web browser executed by computing device 120 may render the web page/landing page associated with the entity. In some implementations, promotional message serving system 110 may receive an indication from computing device 120 that the web page/landing page is being visited/accessed.

In some implementations, user 602 may visit the web page/landing page shortly after the promotional message is selected. In some implementations, selection of the promotional message may cause the web page/landing page to be displayed and/or visited/accessed. In some implementations, the promotional message may include a URL or other address of the web page/landing page such that user 602 may visit the web page/landing page a certain time after the selection of the promotional message. In these implementations, user 602 may select the promotional message but may choose to visit/access the web page/landing page at a later time. In some implementations, the certain time may include minutes, hours, days, or other time after the selection of the promotional message.

In some implementations, in an operation 620, promotional message serving system 110 may receive a request to provide a phone number to be included in the web page/landing page and/or other electronic content of the entity. In some implementations, promotional message serving system 110 may receive the request to provide a phone number to be included in the web page/landing page that is visited/accessed in operation 618. In some implementations, promotional message serving system 110 may receive the request from computing device 120. In some implementations, the web page/landing page associated with the entity may include one or more instructions such as java script code that communicates with promotional message serving system 110 (via one or more function calls, for example). In these implementations, promotional message serving system 110 may receive the request from the java script code included in the web page/landing page. It will be understood that any other scripting language may also be used.

In some implementations, promotional message serving system 110 may receive an indication that the promotional message was previously selected (prior to an access/visit of the web page/landing page and/or other electronic content of the entity). In some implementations, receiving an indication may include retrieving the indication from a memory of computing device 120 used to select the promotional message and/or from a memory accessible to promotional message serving system 110.

In some implementations, in an operation 622, promotional message serving system 110 may determine whether the promotional message was selected by the user prior to an access/visit of the web page/landing page and/or other electronic content of the entity by the user. For example, promotional message serving system 110 may determine whether user 602 clicked on an advertisement of a retailer before visiting the web page of the retailer. In some implementations, the determination may be made by retrieving an indication from the cookie stored at the memory of computing device 120. For example, the cookie may indicate the date/time that the promotional message was selected by the user. By comparing the date/time that the webpage/landing page is visited/accessed with at least the data/time information included in the cookie, a determination regarding whether the promotional message was selected by the user prior to an access/visit of the web page/landing page may be made. In some implementations, in response to a determination that the promotional message was selected by the user prior to an access/visit of the web page/landing page, at least one phone number associated with the promotional message may be selected by promotional message serving system 110 (based on the association between the phone number and the promotional message, for example). In some implementations, promotional message serving system 110 may communicate with call metric system 150 to retrieve and/or select the phone number. In some implementations, in response to a determination that the promotional message was not selected by the user prior to an access/visit of the web page/landing page, a default phone number associated with the entity may be selected by promotional message serving system 110.

For example, user may visit the web page without selecting or otherwise clicking on the promotional message. In other words, the promotional message did not motivate the user to visit the web page. In these cases, the default phone number may be selected. However, when a promotional message associated with the entity was selected by user 602 followed by a visit to the web page, promotional message serving system 110 determines that the promotional message motivated the visit. In this example, the phone number associated with the promotional message is dynamically selected for display.

In some implementations, in an operation 626, promotional message serving system 110 may provide the selected phone number (the associated phone number or default phone number) to be displayed on the web page/landing page. In some implementations, promotional message serving system 110 may provide/communicate the selected phone number to computing device 120. In some implementations, promotional message serving system 110 may provide/communicate the selected phone number in response to the request of operation 620. In some implementations, in an operation 628, the web page/landing page which includes the provided phone number is displayed to user 602 of computing device 120.

In some implementations, the web page/landing page may have an original phone number associated with it, wherein the original phone number may be changed to the selected phone number by inserting the selected phone number in place of the original phone number.

In some implementations, in an operation 630, call metric system 150 may receive one or more calls associated with the promotional message. For example, call metric system 150 may receive a phone call from a user that called a (selected or other) phone number that is displayed on a web page/landing page, or other content associated with the advertisement. In some implementations, the phone call is made using computing device 120. In other implementations, the phone call is made using another device having a telephone function. In some implementations, call metric system 150 may track the received one or more calls. In some implementations, tracking may include monitoring the duration of the calls, area code of the caller associated with the calls, date/time of the calls, recording the calls, transcribing the calls (for the advertiser, for example).

In some implementations, call metric system 150 may track the received one or more calls by determining that the one or more phone calls resulted from the promotional message. In For example, call metric system 150 may determine that a call originated from a promotional message such as an advertisement, thereby attributing the call to the promotional message. Accordingly, when a user calls the phone number, call metric system 150 may determine that the one or more calls originated from the promotional message based on the association between the phone number and the promotional message. In other words, call metric system 150 may associate the phone call with the promotional message based on the phone number (in operation 632) and may determine that the promotional message led to the phone call based on the associated phone call and the promotional message (in operation 634).

In some implementations, associating the phone call with the promotional message can occur until an expiration time associated with the cookie stored in memory of computing device 120. For example, the cookie may have an expiration time of 30 days associated with it (i.e., the cookie expires in 30 days, after which time the cookie will be deleted from the memory of computing device 120). In these implementations, call metric system 150 may associate the phone call with the promotional message even if user 602 were to visit the webpage/landing page and call the phone number (displayed on the webpage/landing page) 30 days after user 602 selected or otherwise clicked on the promotional message. In other words, as long as the phone call based on the phone number is received within 30 days, the phone call may be associated with the promotional message.

In some implementations, the promotional message may be associated with an entity such as an advertiser and a phone number may be associated with the entity. In these implementations, the one or more calls may be tracked by correlating when the promotional message was communicated and when a phone call associated with the phone number was received. As would be appreciated, for example, based on the date/time that the promotional message was communicated and the date/time that the phone call was received, various statistical analyses may be performed to determine that the phone call is correlated with (i.e., resulted from) the promotional message (in other words, that the promotional message led to the phone call).

In some implementations, the phone number may be associated with at least one tracked keyword such that the promotional message associated with the entity may be displayed in response to a tracked keyword. In these implementations, the one or more calls may be tracked by correlating when the tracked keyword was entered, when the promotional message was communicated and when a phone call associated with the phone number was received. As would be appreciated, for example, based on the date/time that the tracked keyword was entered, the date/time that the promotional message was communicated and the date/time that the phone call was received, various statistical analyses may be performed to determine that the phone call is correlated with (i.e., resulted from) the promotional message (in other words, that the promotional message led to the phone call).

In some implementations, in an operation 640, call metric system 150 may establish one or more calls between the user and the entity associated with the promotional message based on the received calls. In some implementations, establishing a call may include forwarding the call to the entity, dialing the entity and bridging the call, etc.

In some implementations, one or more of operations 610-616 may be performed during a first communication session. In some implementations, one or more of operations 618-640 may be performed during a second communication session. In some implementations, the second communication session may occur after the first communication session. For example, user 602 may select the promotional message and the cookie may be stored during the first communication session. User 602 may choose to visit the web page/landing page and call the selected phone number displayed on the web page/landing page during a second communication session 30 days after the first communication session. In some implementations, the phone call may be received during the second communication session. In some implementations, the associating of the phone call with the promotional message and the determination that the communicated promotional message led to the call may be performed during the second communication session and/or before the expiration time associated with the cookie has been reached. In some implementations, one or more of operations 610-640 may be performed during the same communication session. In other words, there might not be a substantial time delay between the first communication session and the second communication session.

In some implementations, different phone numbers may be provided/communicated to user 602 and a second user based on which promotional message they selected or otherwise clicked on. In these implementations, promotional message serving system 110 may communicate a first promotional message to computing device 120 associated with user 602. Promotional message serving system 110 may communicate a second promotional message to computing device 120 associated with the second user (not otherwise illustrated in FIG. 6). The first promotional message and the second promotional message may be associated with a same entity (for example, entity 160). The first promotional message may be associated with a first phone number and the second promotional message may be associated with a second phone number. Promotional message serving system 110 may receive, from user 602, a selection of the first promotional message. Promotional message serving system 110 may receive, from the second user, a selection of the second promotional message. Cookies may be accordingly stored in the respective computing devices used to select the promotional messages. User 602 and the second user may visit the same web page/landing page associated with the entity. In response to a determination that the first promotional message was selected by user 602 prior to an access/visit of the web page/landing page, the first phone number associated with the first promotional message may be selected by promotional message serving system 110. In response to a determination that the second promotional message was selected by the second user prior to an access/visit of the web page/landing page, the second phone number associated with the second promotional message may be selected by promotional message serving system 110. In other words, different phone numbers may be selected based on which promotional message was selected. The selected numbers (first phone number and second phone number) may be provided to be displayed on the web page/landing page (in response to requests from respective computing devices associated with user 602 and the second user, for example). In other words, user 602 and the second user may see different phone numbers on the same web page/landing page based on which promotional message they selected.

In some implementations, call metric system 150 may receive, from a caller, one or more phone calls originated via one or more phone numbers. Call metric system 150 may associate each call with at least one promotional message of one or more promotional messages based on the one or more phone numbers. Call metric system 150 may determine, for each promotional message, a number of calls received from the associated phone number.

In some implementations, call metric system 150 may generate a report. In some implementations, the report may include the one or more promotional messages and the phone numbers associated with the promotional messages. In some implementations, the report may include the determined number of calls for each promotional message. In some implementations, the report may include the monitored, recorded, and/or transcribed information associated with the calls. In some implementations, the report may include conventional metrics associated with promotional message and/or calls as would be appreciated.

In some implementations, call metric system 150 may receive a request for the report from an advertiser (example, entity 160) or other entity. The advertiser or other entity may indicate, among other things, one or more promotional messages for which they would like the report to be generated. In response to the request, call metric system 150 may generate the report for the promotional messages and communicate the report to a remote computing device used by an advertiser (not otherwise illustrated in FIG. 6).

Figure 7:
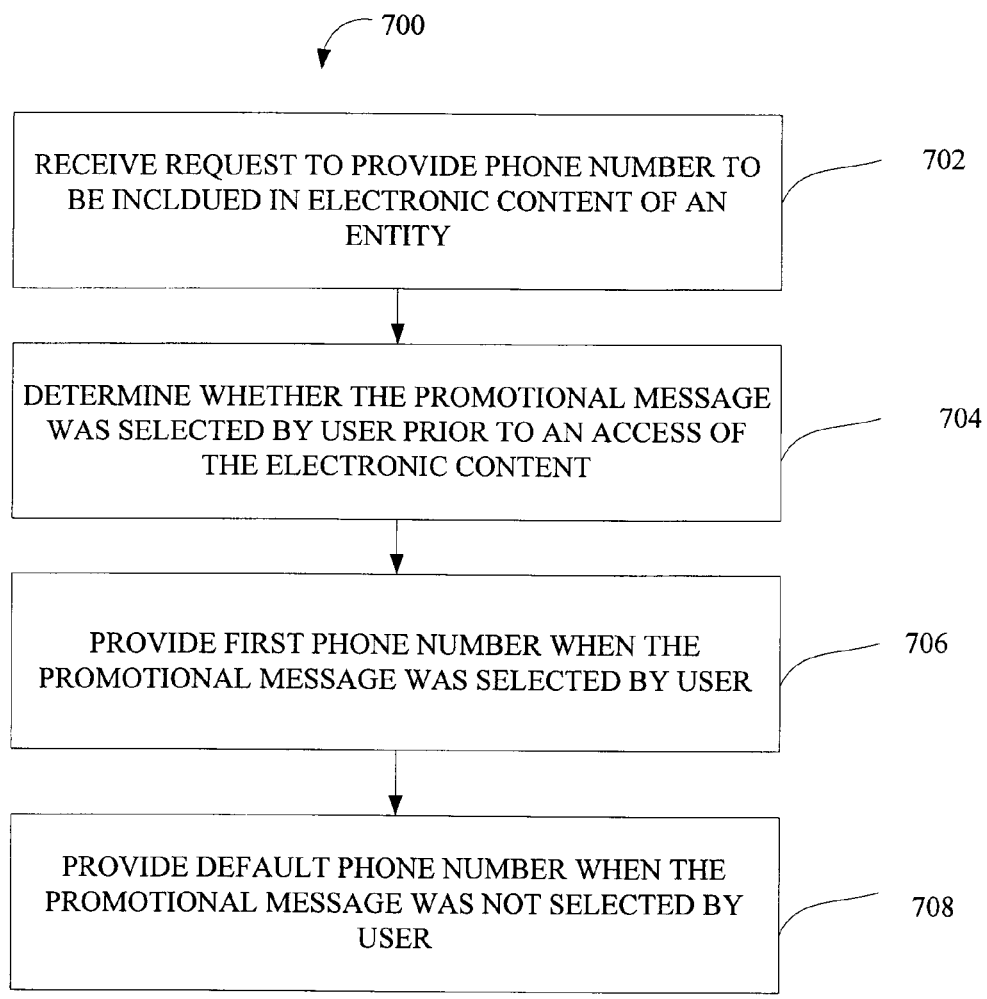
FIG. 7 is a flow diagram illustrating an example process of determining promotional messages that led to a phone call, according to various implementations of the invention.

FIG. 7 is a flow diagram illustrating an example process 700 of changing phone number on content communicated to a user, according to various implementations of the invention. In an operation 702, process 700 may receive a request to provide a phone number to be included in electronic content (for example, web page/landing page) of an entity. In some implementations, the phone number may be selected from at least a first phone number associated with a promotional message or a default phone number associated with the entity.

In an operation 704, process 700 may determine whether a promotional message was selected by a user prior to the access of the electronic content. In some implementations, the determination may be made by retrieving an indication from a memory of a user device used by the user. In some implementations, the indication may be retrieved from a cookie stored at the memory of the user device.

In an operation 706, process 700 may provide a first phone number associated with the promotional message when the promotional message was selected by the user. In some implementations, the first phone number may be selected in response to a determination that the promotional message was selected by the user prior to the access of the electronic content.

In an operation 708, process 700 may provide a default phone number associated with the entity when the promotional message was not selected by the user. In some implementations, the default phone number may be selected in response to a determination that the promotional message was not selected by the user prior to the access of the electronic content.

Figure 8:
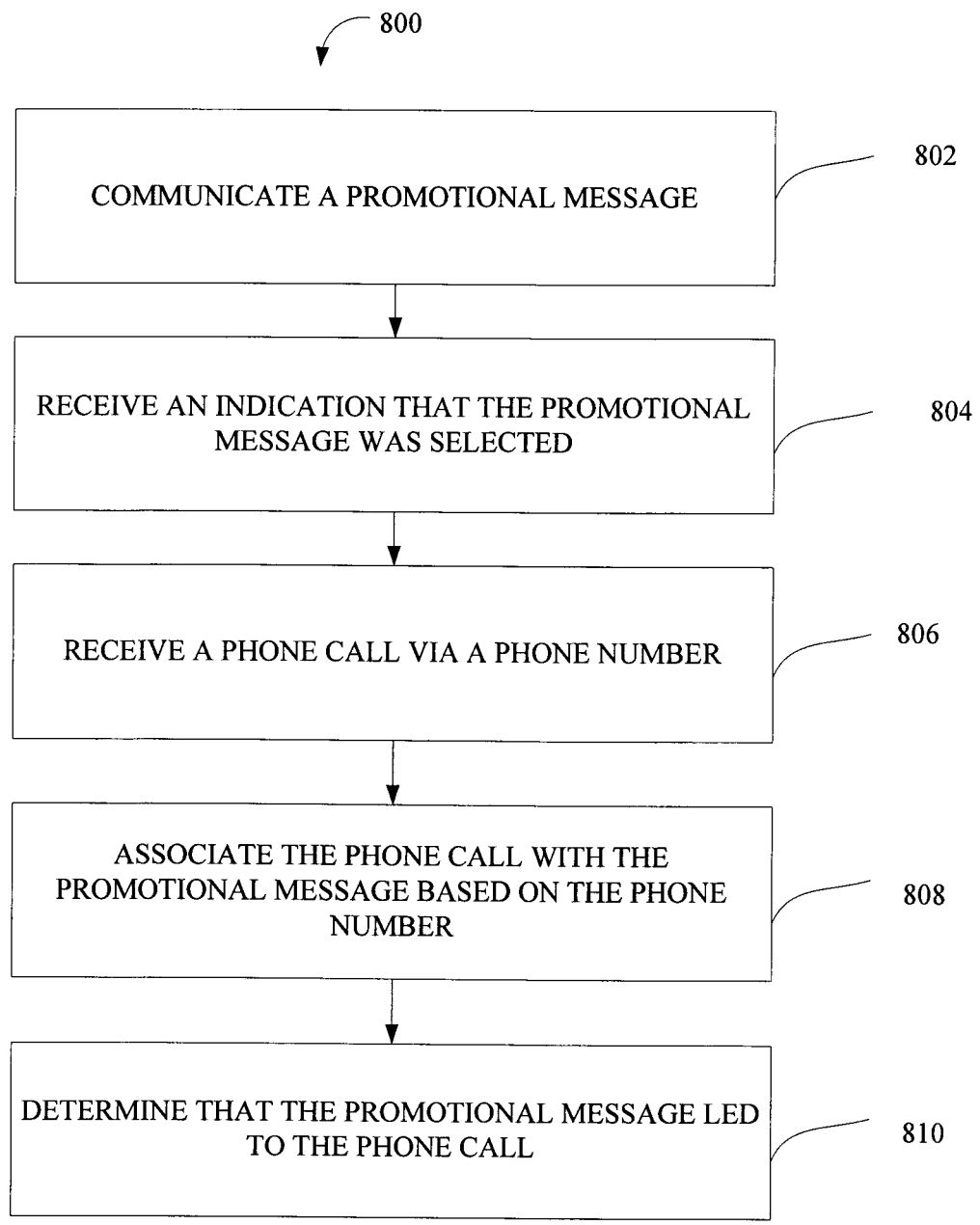
FIG. 8 is a flow diagram illustrating an example process of changing phone numbers on content communicated to a user, according to various implementations of the invention.

FIG. 8 is a flow diagram illustrating an example process 800 of determining promotional messages that led to a phone call, according to various implementations of the invention. In an operation 802, process 800 may communicate a promotional message. In some implementations, the promotional message may be associated with a phone number.

In an operation 804, process 800 may receive an indication that the promotional message was selected. In some implementations, the indication may be retrieved from a memory of a user device used to select the promotional message. In some implementations, the indication may be retrieved from a cookie stored at the memory of the user device.

In an operation 806, process 800 may receive a phone call via a phone number, wherein the phone call may indicate the phone number that was called by a caller. In an operation 808, process 800 may associate the phone call with the promotional message based on the phone number (in other words, based on the association between the promotional message and the phone number). In an operation 810, process 800 may determine that the promotional message led to the phone call based on the associated phone call and the promotional message.

Implementations of the invention may be made in hardware, firmware, software, or any suitable combination thereof. Implementations of the invention may also be implemented as instructions stored on a machine readable medium, which may be read and executed by one or more processors. A tangible machine-readable medium may include any tangible, non-transitory, mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A computer-implemented method comprising:
receiving a request to provide a phone number to be included in electronic content of an entity, wherein the phone number is selected from at least a first phone number associated with a promotional message or a default phone number associated with the entity;
determining whether the promotional message was selected by the user prior to an access of the electronic content by accessing data stored in a memory of a user device used by the user, the data defining a predetermined expiration time interval having a fixed duration that commences upon selection of the promotional message by the user;
providing the first phone number when the promotional message was selected by the user and the request to provide a phone number is received within the expiration time interval; and
providing the default phone number when the promotional message was selected by the user but the request to provide a phone number is not received during the expiration time interval.

2. The computer-implemented method of claim 1, wherein the request to provide a phone number is generated responsive to a tracked keyword which matches a keyword entered by the user in a search field of the device, wherein the tracked keyword is associated with the first phone number.

3. The computer-implemented method of claim 2, in which the expiration time interval is a first time interval, and the method further comprises accumulating a total number of calls to the first phone number over a larger, second time interval, identifying the tracked keyword as an effective keyword responsive to the accumulated total number of calls exceeding a predetermined threshold, and generating a bid to display a different promotional message for a different entity associated with the tracked keyword responsive to the tracked keyword being identified as an effective keyword.

4. A computer-implemented method comprising:
communicating a promotional message associated with a phone number to a user device;
receiving an indication that the promotional message was selected by a user of the user device;
initiating a predetermined time interval of fixed duration that begins upon receipt of the indication that the promotional message was selected by the user;
receiving a phone call via the phone number, the phone call indicating the phone number that was called; and
determining that the communicated promotional message led to the phone call based on the associated phone call being received within the predetermined time interval.

5. The computer-implemented method of claim 4, wherein receiving an indication that the promotional message was selected further comprises retrieving the indication from a data value in a memory of the user device, the data value generated responsive to selection of the promotional message.

6. The computer-implemented method of claim 5, wherein the data value comprises a cookie stored at the memory of the user device, wherein the cookie identifies a time when the user selected the promotional message.

7. The computer-implemented method of claim 4, further comprising:
displaying the communicated promotional message on the user device without revealing the associated phone number to the user; and
displaying a landing page of an entity associated with the promotional message on the user device responsive to user selection of the promotional message, wherein the landing page reveals the associated phone number to the user, and wherein the predetermined time interval is further initiated responsive to the displaying of the landing page.

8. The computer-implemented method of claim 4, wherein the associated phone number is communicated for display on a landing page provided to the user device responsive to user selection of the promotional message, and wherein a different phone number is communicated for display on the landing page responsive to the user not selecting the promotional message.

9. The computer-implemented method of claim 4, wherein the predetermined time interval comprises a plural number of consecutive days, wherein the user selects the promotional message on a first day of the plural number of consecutive days, and the user initiates the phone call on a different, second day of the plural number of consecutive days.

10. The computer-implemented method of claim 4, further comprising determining the phone call arose responsive to another promotional message associated with a different entity responsive to the phone call being received after a conclusion of the predetermined time interval.

11. The computer-implemented method of claim 4, wherein the promotional message is communicated to the user device responsive to a tracked keyword which matches a keyword entered by the user in a search field of the user device, wherein the tracked keyword is associated with the phone number.

12. The computer-implemented method of claim 4, wherein the expiration time interval is a first time interval, and the method further comprises accumulating a total number of calls to the phone number over a larger, second time interval, identifying the tracked keyword as an effective keyword responsive to the accumulated total number of calls exceeding a predetermined threshold, and generating a bid to display a different promotional message for a different entity associated with the tracked keyword responsive to the tracked keyword being identified as an effective keyword.

13. The computer-implemented method of claim 4, further comprising:
associating each promotional message of one or more promotional messages with at least one phone number of one or more phone numbers.

14. The computer-implemented method of claim 13, further comprising:
receiving one or more phone calls originated via the one or more phone numbers;
associating each phone call of the one or more phone calls with at least one promotional message of the one or more promotional messages based on the one or more phone numbers; and
determining, for each promotional message of the one or more promotional messages, a number of calls received from the associated phone number.

15. The computer-implemented method of claim 4, further comprising:
receiving, from a first user, a first selection of a first promotional message;
receiving, from a second user, a second selection of a second promotional message, wherein the first promotional message and the second promotional message are associated with a same entity;
selecting a first phone number based on the first promotional message;
providing the first phone number to be displayed in a web page associated with the entity on a first device associated with the first user within a first predetermined time interval initiated by the first selection of the first promotional message by the first user;
selecting a second phone number based on the second promotional message; and
providing the second phone number to be displayed in the web page associated with the entity on a second device associated with the second user within a second predetermined time interval initiated by the second selection of the second promotional message by the second user.

16. A computer-implemented system comprising one or more processors configured to:
communicate a promotional message associated with a phone number to a user device;
receive an indication that the promotional message was selected by a user of the user device;
initiate a predetermined time interval based on receipt of the indication that the promotional message was selected by the user, the predetermined time interval comprising a fixed plural number of days that follow said selection of the promotional message by the user;
receive a phone call via the phone number, the phone call indicating the phone number that was called;
associate the phone call with the promotional message based on the phone number; and
determine that the communicated promotional message led to the phone call based on the associated phone call, the promotional message, and receipt of the phone call prior to expiration of the predetermined time interval, else determine that the communicated promotional message did not lead to the phone call based on receipt of the phone call after expiration of the predetermined time interval.

17. The computer-implemented system of claim 16, wherein the one or more processors configured to receive an indication that the promotional message was selected further comprise one or more processors configured to retrieve the indication from a memory of the user device used to select the promotional message, said indication provided by a cookie that is stored in the memory of the user device responsive to user selection of the promotional message, the cookie indicating a commencement date of the predetermined time interval.

18. The computer-implemented system of claim 17, wherein the one or more processors configured to retrieve the indication further comprise one or more processors configured to determine receipt of the phone call occurs prior to expiration of the predetermined time interval by comparing a date of the receipt of the phone call to the commencement date from the cookie.

19. The computer-implemented system of claim 16, wherein the one or more processors are further configured to:
receive an indication that a web page associated with the promotional message is being visited;
select the phone number associated with the promotional message; and
provide the phone number such that the phone call to the phone number is associated with the promotional message that led to the phone call.

20. The computer-implemented system of claim 16, wherein the promotional message is selected during a first communication session during which the user device is activated, and wherein the phone call is received during a second communication session of the user device during which the user device is activated, wherein the second communication session occurs after the first communication session and wherein the user device is deactivated between the first communication session and the second communication session.

21. The computer-implemented system of claim 20, wherein the promotional message is communicated to the user device responsive to a tracked keyword which matches a keyword entered by the user in a search field of the user device, wherein the tracked keyword is associated with the phone number.

22. The computer-implemented method of claim 21, wherein the expiration time interval is a first time interval, and wherein the one or more processors are further configured to accumulate a total number of calls to the phone number over a larger, second time interval, and identify the tracked keyword as an effective keyword responsive to the accumulated total number of calls exceeding a predetermined threshold.

23. The computer-implemented system of claim 22, wherein the one or more processors are further configured to associate the effective keyword to a second promotional message of a different entity.

24. The computer-implemented system of claim 16, wherein the one or more processors are further configured to establish a call between the caller and an entity associated with the promotional message based on the received phone call.

25. The computer-implemented system of claim 16, wherein the one or more processors are further configured to:
receive, from a first user, a first selection of a first promotional message;
receive, from a second user, a second selection of a second promotional message, wherein the first promotional message and the second promotional message are associated with a same entity;
select a first phone number based on the first promotional message;

provide the first phone number to be displayed in a web page associated with the entity on a first device associated with the first user within a first predetermined time interval initiated by the first selection of the first promotional message by the first user;
select a second phone number based on the second promotional message; and
provide the second phone number to be displayed in the web page associated with the entity on a second device associated with the second user within a second predetermined time interval initiated by the second selection of the second promotional message by the second user.

* * * * *

UNITED STATES PATENT AND TRADEMARK OFFICE
CERTIFICATE OF CORRECTION

PATENT NO. : 8,619,952 B2
APPLICATION NO. : 12/985745
DATED : December 31, 2013
INVENTOR(S) : Surojit Chatterjee, Anshul Kothari and Chen Chen It is certified that error appears in the above-identified patent and that said Letters Patent is hereby corrected as shown below:

In the Claims:

Column 20, line 42, in Claim 22, delete "method" and insert -- system --, therefor.

Signed and Sealed this
Nineteenth Day of August, 2014

Michelle K. Lee
*Deputy Director of the United States Patent and Trademark Office*